United States Patent
He et al.

(10) Patent No.: US 6,791,786 B2
(45) Date of Patent: Sep. 14, 2004

(54) ACTIVE DAMPING OF TWO-STAGE ACTUATOR SYSTEM IN A DISC DRIVE

(75) Inventors: JianBo He, Longmont, CO (US); Joseph Cheng-Tsu Liu, Singapore (SG); Kevin Gomez, Singapore (SG); Tao Zhang, Kingston (CA)

(73) Assignee: Seagate Technology LLC, Scotts Valley, CA (US)

( * ) Notice: Subject to any disclaimer, the term of this patent is extended or adjusted under 35 U.S.C. 154(b) by 460 days.

(21) Appl. No.: 09/734,454

(22) Filed: Dec. 11, 2000

(65) Prior Publication Data

US 2002/0101681 A1 Aug. 1, 2002

Related U.S. Application Data

(60) Provisional application No. 60/205,924, filed on May 22, 2000.

(51) Int. Cl.[7] ............................ G11B 5/596; G11B 21/02
(52) U.S. Cl. ..................... 360/78.05; 360/75; 360/78.06
(58) Field of Search ................................. 360/75, 78.05, 360/78.06, 77.02, 77.03, 78.04, 78.09, 294.3, 294.4, 264.4

(56) References Cited

U.S. PATENT DOCUMENTS

| | | | |
|---|---|---|---|
| 4,710,687 A | 12/1987 | Kanda | 318/561 |
| 4,972,350 A | 11/1990 | Sander et al. | 369/44.28 |
| 4,980,876 A | 12/1990 | Abate et al. | 369/44.11 |
| 5,119,250 A | 6/1992 | Green et al. | 360/78.06 |
| 5,245,598 A | 9/1993 | Burroughs | 369/44.28 |
| 5,297,024 A | 3/1994 | Carobolante | 360/67 |
| 5,363,253 A | 11/1994 | Nash et al. | 360/69 |
| 5,729,718 A | 3/1998 | Au | 395/494 |
| 5,861,766 A | 1/1999 | Baumer et al. | 327/105 |
| 5,898,541 A | 4/1999 | Boutaghou et al. | 360/109 |
| 5,917,672 A | 6/1999 | Pham et al. | 360/78.09 |
| 5,978,752 A | 11/1999 | Morris | 702/186 |
| 6,052,251 A | 4/2000 | Mohajerani et al. | 360/78.05 |
| 6,064,540 A | 5/2000 | Huang et al. | |
| 6,069,771 A | 5/2000 | Boutaghou et al. | 360/104 |
| 6,088,194 A * | 7/2000 | Imaino et al. | 360/294.3 |
| 6,125,008 A * | 9/2000 | Berg et al. | 360/264.4 |
| 6,268,983 B1 * | 7/2001 | Imada et al. | 360/294.3 |
| 6,351,341 B1 * | 2/2002 | Lee et al. | 360/75 |
| 6,359,748 B1 | 3/2002 | Goker | |
| 6,404,599 B1 * | 6/2002 | Vigna | 360/294.1 |
| 6,583,964 B1 | 6/2003 | Huang et al. | 360/294.4 |
| 6,600,619 B1 * | 7/2003 | Morris et al. | 360/75 |

* cited by examiner

*Primary Examiner*—David Hudspeth
*Assistant Examiner*—Jason Olson
(74) *Attorney, Agent, or Firm*—Westman, Champlin & Kelly, P.A.

(57) ABSTRACT

An actuator control system for a two-stage actuator system of a disc drive has a first, or primary, stage actuator consisting of a voice coil motor that positions the head relative to a disc and a microactuator that alters the actuator system without operation of the voice coil motor. A control loop includes a controller responsive to seek commands to operate the voice coil motor, thereby moving the head relative to the disc. An active damping circuit is coupled to the head to operate the microactuator to damp resonance modes of the actuator system.

12 Claims, 4 Drawing Sheets

ACTIVE DAMPING OF TWO-STAGE ACTUATOR SYSTEM IN A DISC DRIVE

CROSS-REFERENCE TO RELATED APPLICATION

This application claims priority of U.S. Provisional Application No. 60/205,924, filed May 22, 2000 for "Active Damping Method to Improve Seek Time in an Arm-based Microactuator System".

FIELD OF THE INVENTION

This invention relates to disc drives, and particularly to techniques for active damping of two-stage actuator systems in disc drives.

BACKGROUND OF THE INVENTION

The actuator system of disc drives includes a rigid extended actuator arm that supports a flexible suspension at the distal end of the arm, with the suspension supporting an aerodynamic slider arranged to "fly" over an associated storage disc surface. The slider includes a transducing head arranged to read data from and write data to concentric tracks on the disc. A voice coil motor operates the actuator arm to rotate about an actuator arm axis outside the periphery of the disc to thereby move the slider and head to selected radial positions adjacent data tracks on the disc.

As the track density within disc drives increases, the radial distance between track centers on the discs decreases. As a result, it has been increasingly difficult for traditional voice coil motors to accurately operate the actuator arm to position the head over the center of a selected track. For this reason, microactuators have been employed in the arm, suspension or slider, to fine position the head. The voice coil motor is employed to coarsely position the transducing head in relation to the track, and track following and fine positioning is accomplished using the microactuator. Examples of microactuators in the arm, suspension and slider can be found in U.S. Pat. No. 5,898,541 granted Apr. 27, 1999 to Zine-Eddine Boutaghou and Lowell J. Berg, U.S. Pat. No. 6,052,251 granted Apr. 18, 2000 to Khosrow Mahajerani, Joseph M. Sanpietro, Anoush M. Fard, Jeffrey G. Barina, Muhammad A. Hawwa, LeRoy A. Volz, Tien Q. Le and Daniel R. Vigil, and U.S. Pat. No. 6,069,771 granted May 30, 2000 to Zine-Eddine Boutaghou and Joseph C. Liu, all assigned to the same assignee as the present invention. Disc drive actuator systems using both voice coil motors and microactuators are known as dual-stage or two-stage actuator systems.

Track seeking with a two-stage actuator system is described in U.S. Pat. No. 5,978,752 granted Nov. 2, 1999 to John C. Morris and assigned to the same assignee as the present invention. Track seeking with a two-stage actuator system is performed by operating the voice coil motor move the actuator system in accordance with a seek profile selected by the disc controller. The seek profile defines the velocity and position of the actuator arm as it moves the head from the start track to the destination track. The controller derives an actuator signal based on the selected seek profile to operate the voice coil motor. The voice coil motor moves the actuator arm to coarsely position the head relative to the destination track. The controller then operates the microactuator to fine position the head and to perform track following functions.

Structural resonance within the disc drive, and particularly within the actuator system during a seek, adversely affects the seek operation, causing the actual seek position and velocity profile to be different from that selected by the controller. Consequently, it is common to monitor the track position and profile compensate the actuator signal to actively damp the resonance of the actuator system and achieve a smooth seek profile. However, the compensation to the actuator signal, and the seek itself, introduces delay to the seek operation. Moreover, aggressive seek profiles cause oscillation during settling. The present invention provides a solution to this and other problems, and offers other advantages over the prior art.

SUMMARY OF THE INVENTION

The present invention is directed to an actuator control system for a two-stage actuator system of a disc drive. The actuator system has a first, or primary, stage actuator consisting of a voice coil motor that positions the head supported by the actuator system relative to a disc. The actuator system includes a microactuator that alters the actuator system without operation of the voice coil motor, such as by moving the slider relative to the suspension, by moving the suspension relative to the actuator arm, or by distorting the actuator arm. The actuator control system includes a control loop that is responsive to seek commands to provide an actuator signal that operates the voice coil motor, thereby moving the head relative to the disc. Means is responsive to the position signals to operate the microactuator to damp resonance modes of the actuator system. In preferred embodiments, the control loop further includes a summing device responsive to position signals from the head to modify the actuator signal.

The actuator system includes an actuator arm arranged to rotate about an actuator axis, and a suspension coupled to an end of the actuator arm, a slider coupled to the suspension supporting a head adjacent a disc. The voice coil motor is coupled to the actuator arm and is operable to rotate the actuator arm about the actuator axis to thereby adjust a position of the head relative to the disc. The microactuator is supported on at least one of the actuator arm, suspension and slider, and is operable to adjust the position of the head relative to the disc without operation of the voice coil motor. The actuator control system includes a controller responsive to the seek commands for providing an actuator signal to operate the voice coil motor to move the head relative to the disc. An active damping circuit is coupled to the head to operate the microactuator to damp resonance modes of the actuator system.

In one form of the invention, a process is provided to actively dampen a two-stage actuator system of a disc drive during a seek operation. An actuator signal, based on a seek command, is applied to the voice coil motor to move the head supported by the actuator system. The microactuator on the actuator system is operated based on position signals from the head during the seek operation to damp resonance modes of the actuator system.

Other features and benefits that characterize the present invention will be apparent upon reading the following detailed description and review of the associated drawings.

DETAILED DESCRIPTION OF ILLUSTRATIVE EMBODIMENTS

Figure 1:
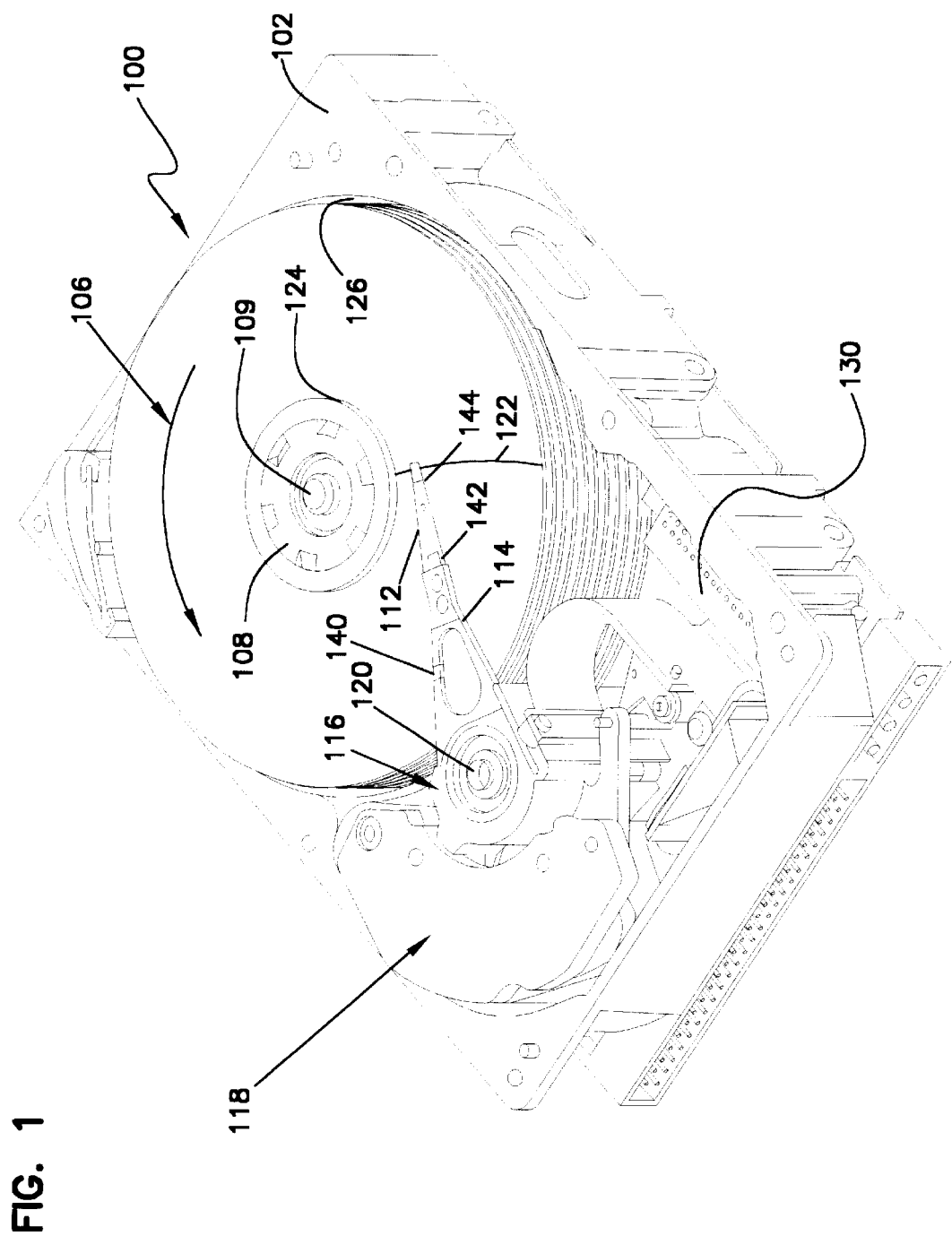
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head arranged to write data to, and read data from, concentric tracks on the confronting disc surface. In the example shown in FIG. 1, head-sliders 110 are supported by flexible suspensions 112 which are in turn attached to rigid track accessing actuator arms 114 of an actuator system 116. Actuator system 116 is driven by a voice coil motor (VCM) 118 to rotate the actuator, and its attached heads 110, about a pivot shaft 120. Rotation of actuator 116 moves the heads along an arcuate path 122 to position the heads over a desired radial data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs. Actuator system 116 includes a microactuator 140, 142 or 144 for fine positioning and track following purposes. The microactuator may be a device designed to operate on any of several principles, including piezoelectric, electromagnetic, electrostatic, capacitance, fluidic and thermal principles, to name a few. FIG. 1 illustrates that the microactuator may be positioned at various locations in the actuator system—thus, microactuator 140 may be in one or both sides of rigid actuator arm 114, microactuator 142 may be coupled between actuator arm 114 and suspension 112, or microactuator 144 may be an element 144 of slider 110. While the specific structure and position of the microactuator 140, 142, 144 is not important to the present invention, normally only one such microactuator is employed.

Seek operations are performed employing estimators that are used to predict the actuator velocity and bias force. The estimator is designed on the basis of a double integrator model that assumes that the actuator system 116 is a rigid body. In practice, however, the actuator system is not a rigid body. When the actuator is moved during a seek operation, mechanical resonance modes of the actuator are excited. The resonance continues into the seek settling period, resulting in an oscillating position error signal. To address this problem, a feedback controller, shown in FIG. 2, is introduced into the seek loop to control the estimated velocity and measured position as close to the selected profile (velocity and position) as possible.

Figure 2:
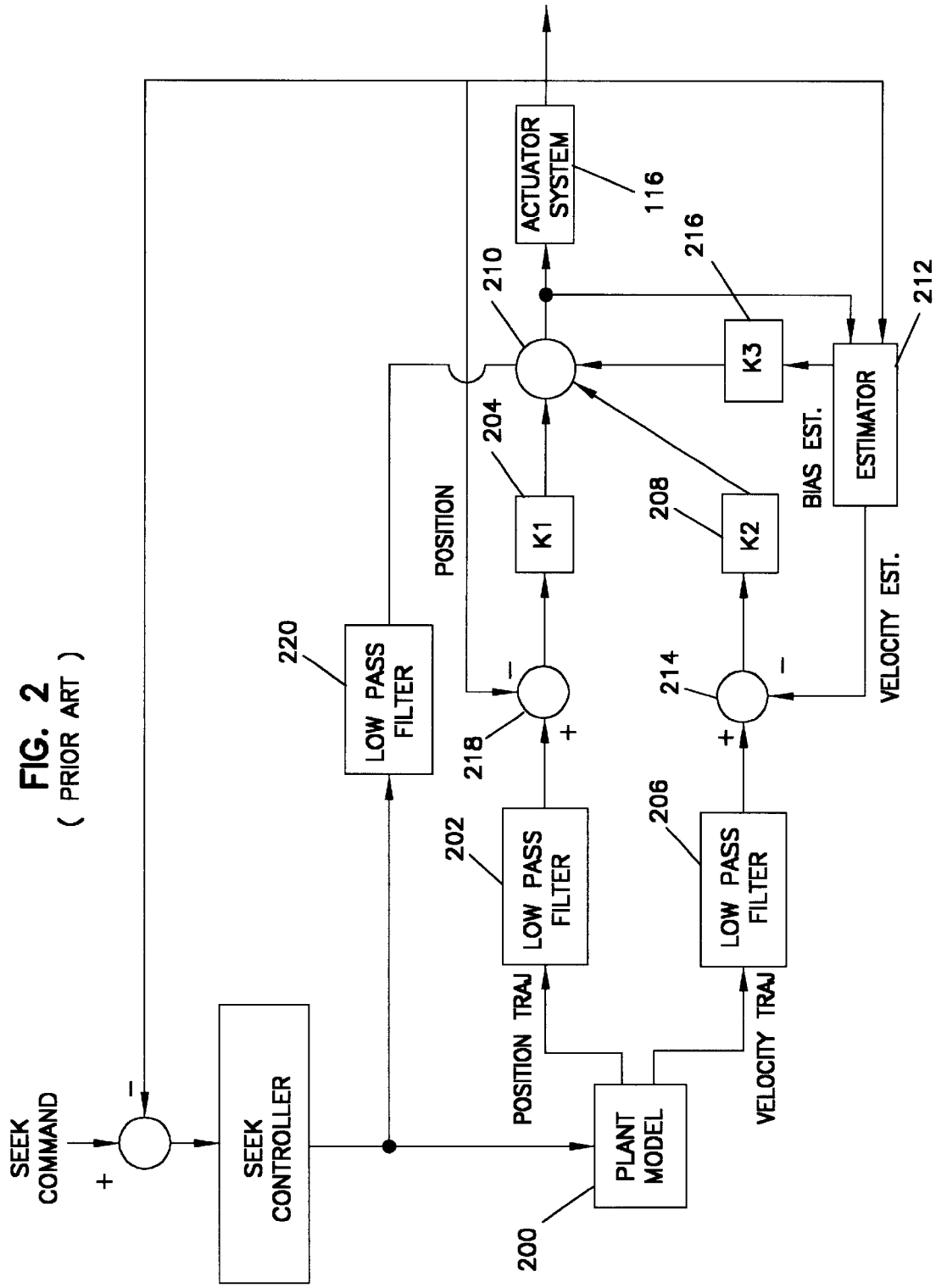
FIG. 2 is a block circuit diagram of a prior art active damping circuit for an actuator system.

FIG. 2 illustrates a position mode model reference seek diagram according to the prior art, where a state feedback controller attenuates error induced by model mismatch. A seek command selects a seek profile algorithm 224 which is applied to the actuator system model 200. Model 200 supplies an actuator signal to the voice coil motor 118 (FIG. 1) of actuator system 116. More particularly, the actuator signal includes a position trajectory signal that is filtered by low-pass filter 202 and applied to the feedback gain of position error loop 204, and a velocity trajectory signal that is filtered by low-pass filter 206 and applied to the feedback gain of velocity error loop 208. The signal outputs from gains 204 and 208 are summed at 210 and applied to the voice coil motor 118 of actuator system 116. The read head 110 of actuator system 116 reads the current position of the head relative to the disc and supplies a position signal representative of the current position of head 110 to estimator 212. Estimator 212 receives a second input directly from the output of summing device 210 to derive a velocity estimate signal and a bias estimate signal. The velocity estimate signal is applied to summing device 214 where it is summed with the velocity signal passed by low-pass filter 206 for input to gain 208. The bias estimate signal is applied to state feedback gain 216 for input to summing device 210. The output of actuator system 116 is also provided as an input to summing device 218 which sums that signal with the position trajectory signal passed by low-pass filter 202 for input to gain 204. Low-pass filter 220 is coupled between the input and summing device 210. The output of actuator system 116 is also provided as an input through summing device 222 to adjust the seek profile algorithm 224 based on the current position of head 110.

The actuator signal selected by model 200 is based on the seek profile derived from a seek command. The circuit illustrated in FIG. 2 forms a control loop whereby the output from the actuator system 116, as sensed by head 110 (FIG. 1), is looped back in the form of velocity estimate signals and bias estimate signals by estimator 212 and actual position signals to summing circuit 218 to perform corrections to the actuator signal. The corrections are thus based on the actual position of the head during the seek operation. The actuator signal is modified so that the actual position/velocity profile of the head matches that of the seek profile supplied by the model. However, actuator resonance modes are excited during the seek, necessitating introduction of damping compensators.

The transfer function, G1(s), of the actuator system 116 operated by voice coil motor 118 can be modeled as a double integrator with a translation mode:

$$G1(s) = \frac{\alpha}{s^2} \frac{N(s)}{D(s)}, \tag{1}$$

where $\alpha$ is a loop gain constant, s is a frequency parameter and N(s)/D(s) models the translation mode of the voice coil motor. If the actuator system were a rigid body, the translation mode would be unity (N(s)/D(s)=1) and G1(s) would equal $\alpha/s^2$. Since the actuator system is not a rigid body, N(s)/D(s) is not unity. Instead, the translation mode N(s)/D(s) may be expressed in the form $$\frac{N(s)}{D(s)} = \frac{\omega^2}{s^2 + 2\xi\omega s + \omega^2}, \tag{2}$$

where $\xi$ is the damping ratio and $\omega$ is the natural resonance frequency of the actuator system. For example, the actuator system of one exemplary disc drive exhibits a damping ratio, $\xi$, of 0.09 and a natural resonance frequency, $\omega$, of 21991 radians/second. Without active damping of the actuator signal, this disc drive would exhibit significant oscillation in the position error signal during settling. For this reason, low-pass filters 202 and 206, and the associated gains 204, 208 and 216, are designed to pull down the actuator signal based on the selected seek profile. Pulling down the actuator signal to voice coil motor 118 avoids exciting the specific actuator resonance modes. Low-pass filter 220 is used to avoid applying an aggressive seek profile signal to actuator system 116.

Figure 3:
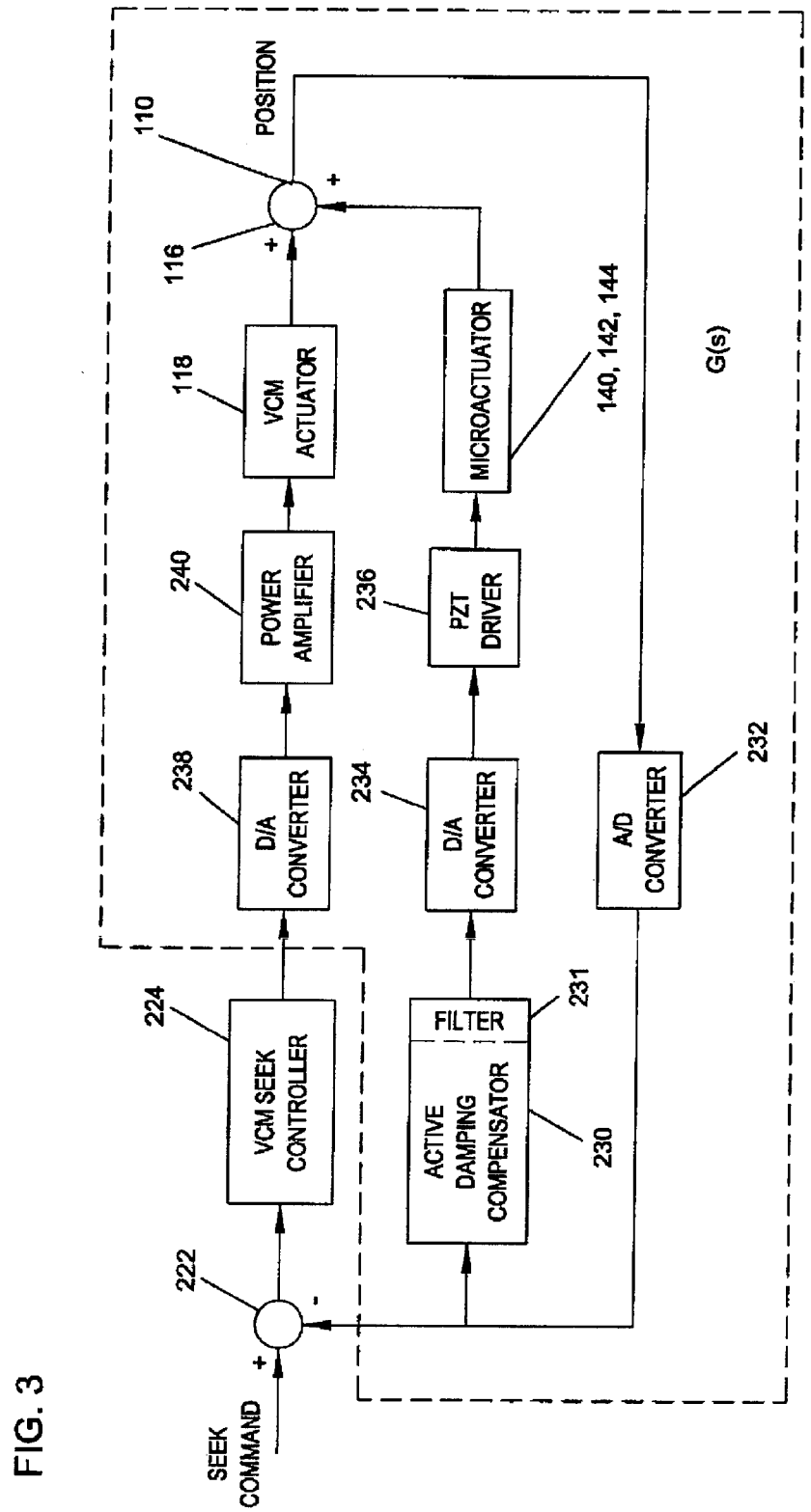
FIG. 3 is a block circuit diagram of an active damping circuit for a two-stage actuator system according to one embodiment of the present invention.

FIG. 3 is a circuit diagram of an active damping circuit for a two stage actuator system according to the presently preferred embodiment of the present invention. Damping compensator 230 receives position signals from the head 110 of actuator system 116 to provide compensation signals to microactuator 140, 142 or 144, as the case may be. More particularly, head 110 reads track crossing data during a seek operation and provides analog position signals to analog-to-digital converter 232. Converter 232 supplies digital signals representing position to damping compensator 230. Damping compensator 230 is modeled to dampen the resonance modes of actuator system 116. Compensator 230 provides damping signals to digital-to-analog converter 234 which provides analog damping signals to driver 236. Driver 236 supplies drive signals to operate microactuator 140, 142, 144, as the case may be. In one example, the microactuator includes a piezoelectric element that is integral with actuator system 116, and driver 236 is a piezoelectric driver that derives a drive voltage to operate the piezoelectric element. Digital position signals are also summed at summing device 222 to adjust the seek profile algorithm provided by seek controller 224 based on the actual head position relative to the disc. The seek controller selects a seek profile based on the seek command, the seek profile defining the expected velocity of the head radial movement at various track positions between the start and destination tracks. If the actuator system exhibited no resistance to movement, the actuator signal to voice coil motor 118 would be a non-zero value only during periods of acceleration and deceleration of head movement; a zero-valued actuator signal is all that would be necessary to maintain a constant velocity during a seek operation. Thus, controller 224 would provide digital signals representing only the acceleration and deceleration cycles of the seek operation. However, friction, air resistance and turbulence, and other environmental factors affect movement of the head, so the selected seek profile normally includes digital signals necessary to maintain velocities, in addition to the acceleration and deceleration cycles. Moreover, by summing the actual position signals with the digital signals representing the selected seek profile, controller 224 is able to adjust the digital actuator signal so that the optimal seek signals are derived. The digital actuator signal is converted to an analog actuator signal by digital-to-analog converter 232, which in turn is amplified by amplifier 240 and supplied to operate voice coil motor 118 to move the actuator arm 114, suspension 112 and head/slider 110, including the microactuator 140, 142 or 144.

It will be appreciated that the circuit of FIG. 3 provides two control loops. A first control loop receives the seek commands and drives voice coil motor 118 of actuator system 116 with a seek profile algorithm that is modified by the actual position of head 110 of the actuator system. The other control loop drives the microactuator 140, 142 or 144 to damp the resonance modes of the actuator system. Thus, the microactuator is operated as an active damper to damp the resonance modes. Consequently, oscillations in the position error signal are minimized, and a more aggressive seek profile 224 may be applied to the first control loop and the voice coil motor, resulting in shorter seek times.

The transfer function of the two-stage actuator system employing the microactuator as an active damper can be represented by $$G(s) = G1(s) \frac{1}{1 - G2(s)K4(s)}, \quad (3)$$

where G2(s) is the transfer function of the microactuator and K4(s) is the damping function of compensator 230. G(s) is the actual system the voice coil motor actuator will apply to. Ideally, the transfer function G(s) would equal $$K4(s) = \frac{1}{G2(s)} \frac{D(s) - N(s)}{D(s)}, \quad (4)$$

and K4(s) could be represented by $$\frac{\alpha}{s^2},$$

where N(s) and D(s) are the numerator and denominator, respectively, of the translation mode of the voice coil motor. In a large frequency band, the frequency response G2(s) of the microactuator is a constant. Consequently, $$\frac{1}{G2(s)}$$

can be replaced by a constant gain g. To avoid implementation difficulties with K4(s) in equation (4), G(s) may be set as $$G(s) = \frac{\alpha}{s^2} \frac{N_x(s)}{D_x(s)}, \quad (5)$$

where $N_x(s)$ and $D_x(s)$ are numerator and denominator, respectively, of the translation mode of a highly damped second order plant. Consequently, the damping value of compensator 230 may be expressed as $$K4(s) = g \frac{D(s)N_x(s) - D_x(s)N(s)}{D(s)N_x(s)}, \quad (6)$$

To avoid driving the microactuator outside of its frequency band, damping compensator 230 may include a band pass filter 231 tuned to the bandwidth of the microactuator. Consequently, the value of damping compensator 230 is $$K4(s) = g * BPF(s) \frac{D(s)N_x(s) - D_x(s)N(s)}{D(s)N_x(s)}, \quad (7)$$

where BPF(s) is the band pass filter response.

Figure 4:
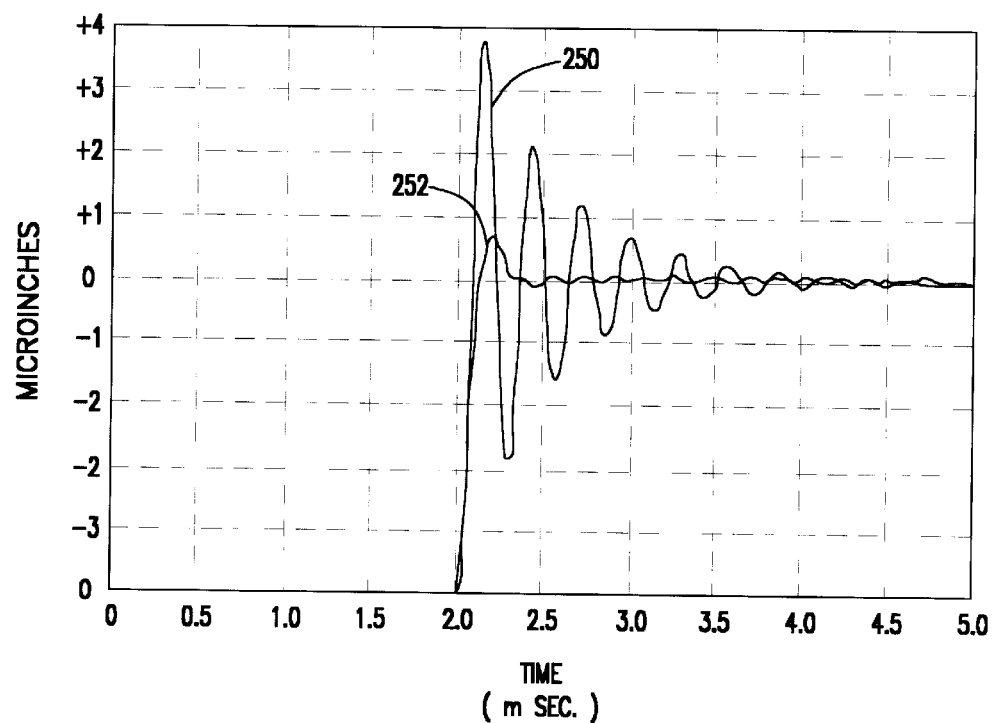
FIGS. 4 and 5 are graphs illustrating the effect of the active damping circuit illustrated in FIG. 3.
Figure 5:
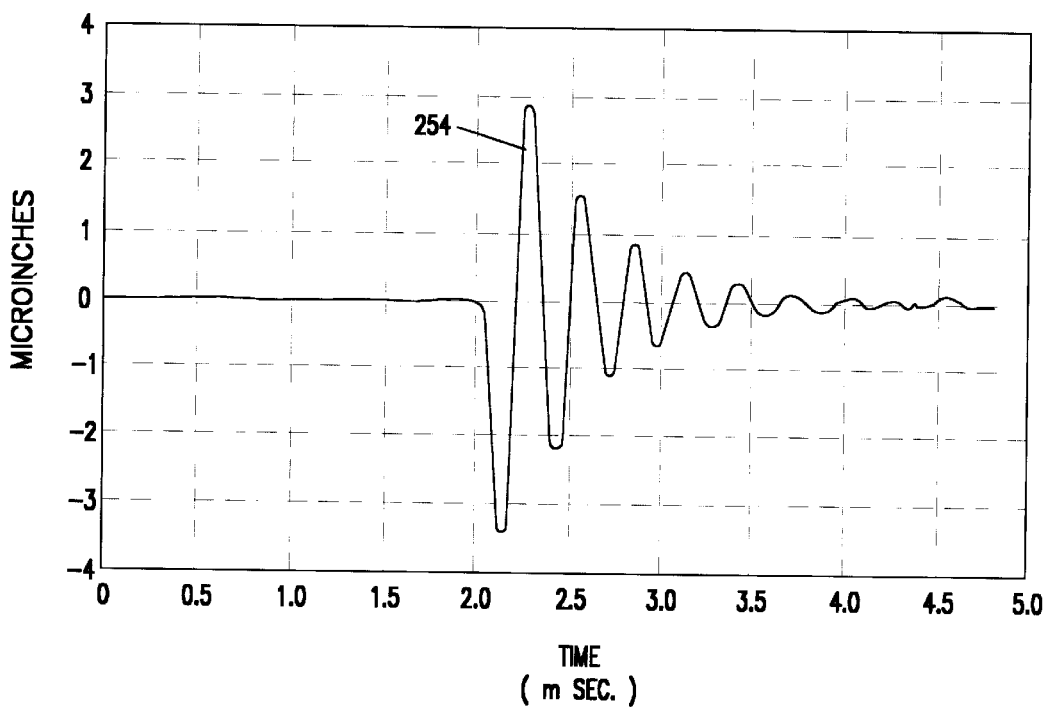

FIG. 4 illustrates the settling movement of the head during the settling period following a seek operation both with and without damping effect by the microactuator. FIG. 5 represents the damping effect on the head movement due solely to operation of microactuator 140, 142 or 144 during the settling period. In FIG. 4, curve 250 represents head movement about track center when the voice coil motor 118 is operated with an aggressive seek profile signal and without the damping by the microactuator according to the present invention. At time 2.0 milliseconds (msec), the seek operation has brought head 110 to the destination track 0. The head, however, reads position error and supplies track position signal that includes representation of the position error to controller 224. As a result, without the damping according the present invention, the head will oscillate across the destination track as illustrated by curve 250 in FIG. 4, resulting in oscillations of the position error signal.

Controller 224 operates damping compensator 230 to respond to the position error signal to drive microactuator 140, 142 or 144 with a damping signal which has the effect of creating an offset position illustrated by curve 254 in FIG. 5. The damping signal operates the microactuator to adjust the track position of head 110, pulling the head more quickly to the destination track. As a result, track error oscillations are dampened, so controller 224 receives smaller track error oscillations resulting in a shorter settling period as illustrated by curve 252 in FIG. 4. It should be recognized that the movement depicted by curve 254 does not actually exist. Instead, curve 254 represents the movement of the head that would occur due solely to the operation of microactuator 140, 142 or 144. Thus, curve 252 illustrates the sum of curves 250 and 254, which is the actual movement of the head, and demonstrates the quicker settling of the head to the destination track than would exist without the damping system of the present invention. A comparison of curves 252 and 250 reveals improved step response of the actuator system employing the microactuator damping according to the present invention.

Alternatively characterized, the invention provides an actuator control system (FIG. 3) for an actuator system 116 of a disc drive 100. The actuator system has a voice coil motor 118 for positioning a head 110 supported by the actuator system relative to a disc 106, and has a microactuator 140, 142 144 for altering the actuator system without operation of the voice coil motor. The actuator control system comprises a control loop 222, 224, 238, 240 responsive to seek commands to provide an actuator signal to operate the voice coil motor 118 to move the head relative to the disc. Means 230, 234, 236 are responsive to the position signals to operate the microactuator 140, 142, 144 to damp resonance modes of the actuator system.

In a preferred embodiment of the invention, a disc drive 100 has at least one disc 106 and an actuator system 116. The actuator system includes an actuator arm 114 arranged to rotate about an actuator axis is 120. A flexible suspension 112 is coupled to an end of actuator arm 114. A slider 110 is coupled to suspension 112 for supporting a head adjacent disc 106. A voice coil motor 118 is coupled to actuator arm 114 and is operable to rotate the actuator arm about the actuator axis to thereby adjust the position of head 110 relative to disc 106. A microactuator 140, 142 or 144 adjusts the position of head 110 relative to the disc independent of operation of voice coil motor 118. An actuator control system (FIG. 3) receives seek commands representative of a desired seek function to operate voice coil motor 118 to move the head relative to the disc. The actuator control system includes controller 224 responsive to the seek commands to provide an actuator signal to operate the voice coil motor 118 to move the head relative to the disc. An active damping circuit 230 is coupled to the head to operating the microactuator 140, 142, 144 to damp resonance modes of the actuator system.

In a preferred manner of operation, a two-stage actuator system 116 of a disc drive 100 is actively damped during a seek operation. The process comprises steps of (a) providing an actuator signal based on a seek command to a voice coil motor 118 that is included in a control loop 222, 224, 238, 240 to move a head 110 supported by the actuator system, and (b) operating a microactuator 140, 142, 144 on the actuator system based on the position signals from the head 110 during the seek operation to damp resonance modes of the actuator system.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the damping system while maintaining substantially the same functionality without departing from the scope and spirit of the present invention. In addition, although the preferred embodiment described herein is directed to an actuator system for a magnetic disc drive, it will be appreciated by those skilled in the art that the teachings of the present invention can be applied to other systems, such as an optical disc drive, without departing from the scope and spirit of the present invention.

What is claimed is:

1. Apparatus comprising:

a transducer;

a suspension supporting the transducer;

an actuator supporting the suspension and operable to position the transducer; and a microactuator coupled to the suspension and operable to damp resonance modes affecting the transducer while the actuator positions the transducer.

2. The apparatus of claim 1, wherein the actuator includes a motor responsive to an actuator signal to position the transducer, and the microactuator is responsive to a position compensation signal to position the transducer, the apparatus further comprises:

a controller responsive to a seek command to provide the actuator signal, and an active damping circuit providing the position compensation signal based on resonance of the transducer.

3. The apparatus of claim 2, wherein the microactuator has a bandwidth and the active damping circuit includes a band pass filter tuned to the bandwidth.

4. The apparatus of claim 2, further comprising:

a control loop coupled to the transducer and to the controller to modify the actuator signal based on a position of the transducer.

5. The apparatus of claim 4, wherein the microactuator has a bandwidth and the active damping circuit includes a band pass filter tuned to the bandwidth.

6. Apparatus comprising:

a transducer;

a slider supporting the transducer;

an actuator supporting the slider and operable to position the transducer; and a microactuator coupled to the slider and operable to damp resonance modes affecting the transducer while the actuator positions the transducer.

7. The apparatus of claim 6, wherein the actuator includes a motor responsive to an actuator signal to position the transducer, and the microactuator is responsive to a position compensation signal to position the transducer, the apparatus further comprises:

a controller responsive to a seek command to provide the actuator signal, and an active damping circuit providing the position compensation signal based on resonance of the transducer.

8. The apparatus of claim 7, wherein the microactuator has a bandwidth and the active damping circuit includes a band pass filter tuned to the bandwidth.

9. The apparatus of claim 7, further comprising:
a control loop coupled to the transducer and to the controller to modify the actuator signal based on a position of the transducer.

10. The apparatus of claim 9, wherein the microactuator has a bandwidth and the active damping circuit includes a band pass filter tuned to the bandwidth.

11. Apparatus comprising:
an active damping compensator responsive to a position signal representing a position of a transducer to provide a position compensation signal; and
a microactuator responsive to the position compensation signal to damp resonance modes affecting the transducer, the microactuator having a bandwidth and the active damping compensator including a band pass filter tuned to the bandwidth.

12. The apparatus of claim 11, further comprising:
a controller responsive to an actuator signal to move the transducer,
a control loop coupled to the controller, and
a summing device responsive to the position signal and a seek command to modify the actuator signal.

* * * * *